United States Patent [19]
Fortini et al.

[11] 3,876,774

[45] Apr. 8, 1975

[54] METHOD OF USING A SIMPLE PROTEIN DERIVED FROM LIVER

[75] Inventors: Jack G. Fortini, Oakland; Walter A. Blair, Palo Alto; Gerald M. Grodsky, San Francisco, all of Calif.

[73] Assignee: Palolab Pharmaceuticals Corporation, Palo Alto, Calif.

[22] Filed: Dec. 27, 1971

[21] Appl. No.: 212,741

Related U.S. Application Data

[60] Division of Ser. No. 763,292, Sept. 27, 1968, abandoned, which is a continuation-in-part of Ser. No. 307,404, Sept. 9, 1963, abandoned, which is a continuation-in-part of Ser. No. 5,376, Jan. 29, 1960, abandoned.

[52] U.S. Cl. .................................................. 424/177
[51] Int. Cl. ...................... A61k 27/00; A61k 17/02
[58] Field of Search ............................. 424/177, 106

*Primary Examiner*—Lewis Gotts
*Assistant Examiner*—Reginald J. Suyat
*Attorney, Agent, or Firm*—Limbach, Limbach & Sutton

[57] ABSTRACT

A new simple protein, described in a copending application, is useful in treating several disease states by enhancing metabolism functions. The protein facilitates glucose uptake in muscle as well as glycogen deposition, leading to utility in the treatment of uremia and shock in animals.

8 Claims, 3 Drawing Figures

METHOD OF USING A SIMPLE PROTEIN DERIVED FROM LIVER

CROSS REFERENCES

This application is a division of application Ser. No. 763,292, filed Sept. 27, 1968, now abandoned, which is a continuation-in-part of application Ser. No. 307,404, filed Sept. 9, 1963, now abandoned, which is a continuation-in-part of application Ser. No. 5,376, filed Jan. 29, 1960, now abandoned.

BACKGROUND OF THE INVENTION

This invention relates generally to a method of using a physiologically active material which influences glucose metabolism. More particularly, the invention relates to a protein which is derivable from liver and has the ability to increase glucose uptake and glycogen synthesis.

The preparation of extracts from liver has gained the attention of many workers, largely because of the great number of biologically active materials present in liver. Derivation of the enzyme arginase was described in an article by Mohamed and Greenberg (Archives of Biochemistry, 8:349, 1945). The extraction process of the present invention is similar in its initial steps to the process described in the article by Mohamed and Greenberg, but the present method makes use of a supernatant liquid which is discarded according to the procedure of Mohamed and Greenberg. Furthermore, the protein of the present invention exhibits physiological activity entirely different from liver arginase.

Very few agents exist which facilitate the absorption of energy sources, such as glucose, into the cells. Most proteins inhibit glucose uptake. One of the few proteins which facilitates glucose absorption and glycogen synthesis is insulin. There is a need for additional proteins manifesting these two properties in combination.

SUMMARY OF THE INVENTION AND OBJECTS

The product of the present invention influences the primary metabolism of carbohydrate and the urea cycle. The product is a biological catalyst present in large amounts in liver. It increases glucose uptake and glycogen synthesis in incubating muscle, influences glucose metabolism in isolated perfused liver and affects glycogen storage in adrenalectomized animals. It acts in vivo to increase glycogen synthesis and to improve renal functions, indicating that it is humorally transported and enters peripheral cells or influences their metabolism at the membrane level. The product is a simple protein of molecular weight approximately 25,000.

It is a further object of the present invention to provide a method of using a product combining the properties of facilitating glucose uptake and glycogen synthesis.

It is a further object of the present invention to provide an improved method of treating uremia in dogs and shock in small animals.

It is a further object of the present invention to provide an improved method of treating hepatitis and certain types of scar tissues such as urethral strictures in humans.

It is a further object of the present invention to provide an improved method of reducing inflammation in soft tissue lesions in animals.

DESCRIPTION OF THE PREFERRED EMBODIMENTS

In our copending application, Ser. No. 212,341, filed Dec. 27, 1971 now U.S. Pat. No. 3,701,768, there is disclosed and claimed a method of extracting a simple protein from liver and the resulting product. The present application relates to the method of using the product there disclosed.

The protein is biologically active and is useful in treating a wide variety of disease conditions. The protein is preferably derived by curtain electrophoresis in which six components in the curtain may be defined.

We have found that the less pure protein derived according to the invention of our U.S. Pat. No. 3,701,768 tends to have a greater stability than the completely purified form. The disclosure of our prior patent is incorporated herein by reference. The presence of other components from the electrophoretic curtain is sometimes desirable from a stability standpoint. Moreover, for some end uses, the properties of other factors in the crude material may be useful without detriment to the activity of the protein of this invention. For that reason, one or more of the other components besides Component II of FIG. 1 in the composition may be utilized. Concentration and purification by paper electrochromatography results in a composition having the protein of the present invention present in a purity up to about 97%. Purity is established using a Beckman-Spinco Analytrol apparatus. A purity within the range between the protein content of the crude extract and the substantially pure protein may be selected as desired from the electrochromatographic curtain. For most purposes, a concentration of 20% or greater of the protein is desirable. Preferably, at least 50% concentration of the protein of this invention should be present to be certain that properties of other ingredients of the crude composition will not be exhibited.

Figure 1:
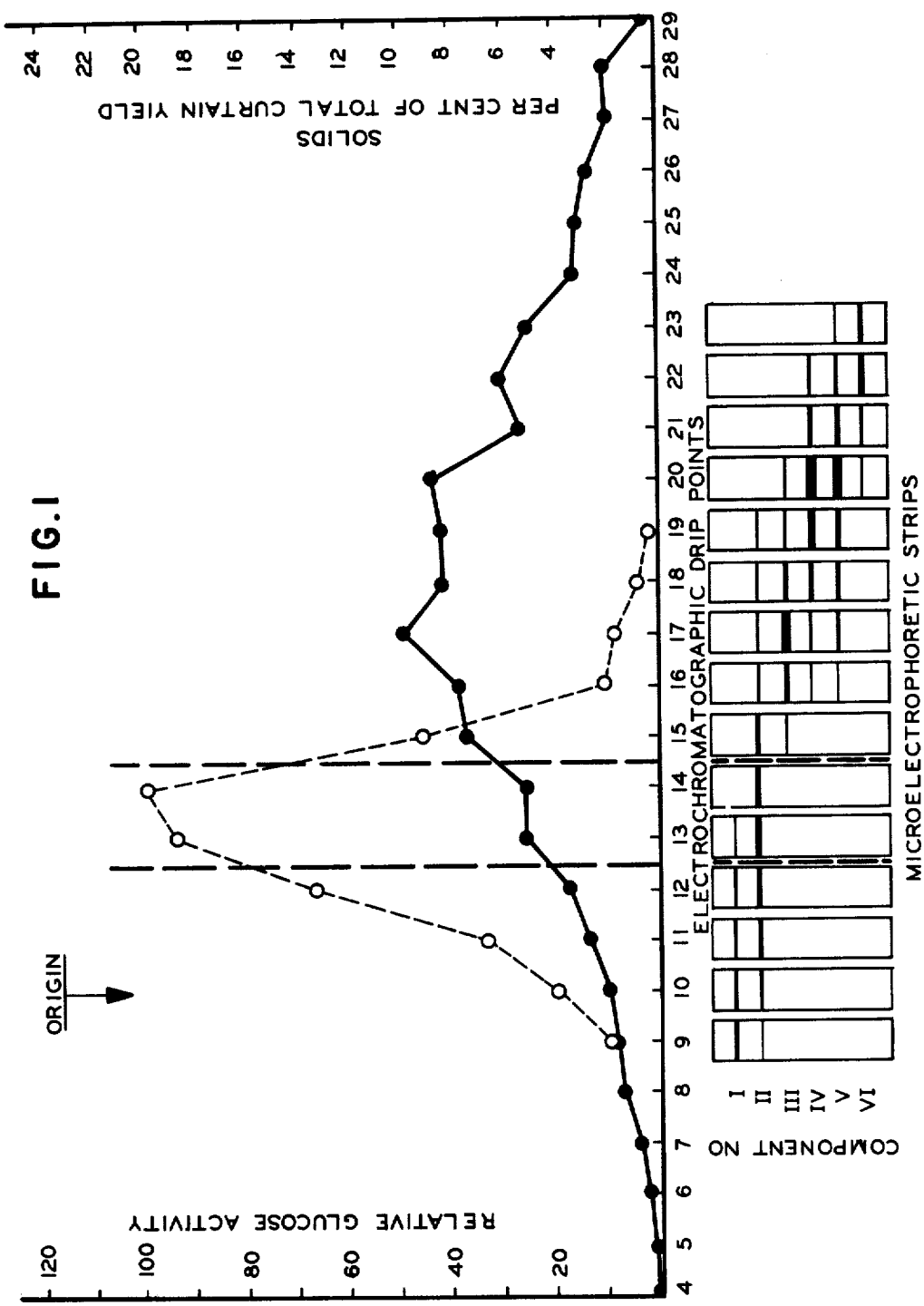
FIG. 1 is an electrochromatogram showing a typical electrophoretic pattern of the crude product containing six protein components.

FIG. 1 is a graphical representation of the relative glucose activity, presently to be described, of the various drip points of the curtain. The crude product solution derived from the process described in our copending application Ser. No. 212,341, filed Dec. 27, 1971 was placed on the curtain at the point indicated "origin" in FIG. 1. Also shown in FIG. 1 are the amounts of solids obtained at the different drip points, indicated as percent solids of total curtain yield. Relative glucose activity is shown in a broken line curve and the solid line curve is indicated as solids present.

It will be noted that the broken line curve peaks sharply at drip points 13 and 14, showing that the glucose activity is greatest in this fraction. The fraction obtained from drip points 13 and 14 is designated "Component II."

Beneath the graph of FIG. 1 in registry with the drip points on the abscissa are representations of microlectrophoretic strips used to indicate the protein components at each drip point. Samples of the product from each of drip points 9 through 23 were taken. Each of these samples was adjusted to a concentration of about 5000 mcg per ml. Cellulose acetate strips 25 mm. in width were provided and a small quantity of drip point sample was applied at the center of each strip. Each strip so tested was subjected to electrophoresis in a microelectrophoresis unit described by Grunbaum and Kirk in Analytical Chemistry, Vol. 32, page 563 (1960). A direct current voltage of 150 volts was applied for 90 minutes. Each strip was then dried and immersed in a 0.2% solution of Ponceau-S stain in 3% aqueous trichloracetic acid for five minutes and then rinsed with 5% acetic acid solution and with water and dried at room temperature between blotters.

The horizontal black bands on each of the strips represent a particular protein (or protein-like) component or fraction of the material from the respective drip point, and the width of the band indicates schematically the relative amount of such material. To the left of the strips in FIG. 1, the Roman numerals I through VI appear in registry with six such marks or bands. It will be seen that band II is predominant in the material from drip points 13 and 14. This component is present in lesser quantities in the strips from drip points 9 to 12 and 15 to 19. As will be seen, the strips 13 and 14 corresponding to the drip points 13 and 14 have the highest proportion of Component II, also by far the highest relative glucose activity.

One important activity of the protein of this invention is its ability to increase glucose uptake by incubating muscle diaphragm of the rat in vitro. The comparative reproducibility of the effect in an in vitro system provides a useful system for both establishing a basic action of the substance and for providing a technique for bioassay. The rat diaphragm system employed was based on earlier methods by Gemmill (Bull. John Hopkins Hospital, Vol. 68, page 329, 1941) and Willebrands, et al. (Science 112, page 277, 1950).

Example 1

The determination of glucose activity was made by preparing an aqueous solution of 280 grams of sodium chloride, 14.8 grams potassium chloride and 12.0 grams $MgSO_4 \cdot 7H_2O$ per liter (referred to as Stock Solution I) and an aqueous solution of 90.8 grams $NaHCO_3$, 6.0 grams $Na_2HOP_4 \cdot 7H_2O$, 1.2 grams $KH_2PO_4$ and 180 mg. phenol red per liter (referred to as Stock Solution II) were prepared. 25 ml. of Stock Solution I and 25 ml. of Stock Solution II were diluted with 900 ml. of water, and 2 ml. of 25% (by weight per volume) of $CaCl_2 \cdot 6H_2O$ solution were added and the solution was gassed with 95% oxygen — 5% $CO_2$ and was made up to one liter. This is referred to as Basic Salt Solution. A Glucose Basic Salt Solution was prepared by dissolving 3.0 grams of reagent grade anhydrous D-glucose in one liter of Basic Salt Solution.

A quantity of material from each drip point of FIG. 1 was diluted with Glucose Basic Salt Solution so that it contained $5.0 \times 10^{-5}$ mcg (microgram) of protein solids per ml. of solution. This will be referred to as Test Solution. Male Sprague Dawley rats (a standard laboratory strain of rats) each weighing $100 \pm 10$ grams were selected and maintained under identical dietetic and environmental conditions for at least five days before the tests described hereinafter. For 24 hours immediately preceding the test each animal was fasted on a wire screen in a separate cage with free access to water. Each animal was killed by decapitation and its hemi-diaphragms were removed by means of a punch designed for this purpose specifically to insure uniformity in cut and weight of tissue samples. Each pair of hemi-diaphragms from an animal was washed, placed on hardened filter paper, blotted slightly, then placed in a flask containing Gey and Gey buffer (Amer. J. of Cancer 27:54, 1936). Reagent grade D-glucose (anhydrous) was included to a final concentration of 300 mg/100 ml. Samples of the invention at varying concentrations ($2 - 10 \times 10^{-4}$ mg.) were added to 2 ml. of buffer which was incubated with the tissue and with shaking under an atmosphere of 95% oxygen 5% $CO_2$. Typical incubation periods were 90 minutes. Hemi-diaphragms were removed, dried, and weighed.

Glucose content was determined in the flask before and after incubation by method of Somogyi, Bio. Chem. 160:62, 1945. Glucose uptake was calculated as milligrams of glucose per 100 milliliters of buffer per 100 milligrams of dried tissue. Glucose uptake is facilitated with increased concentration of the protein of the invention in a log-dose relationship.

The protein of this invention was compared with insulin to determine the relative activity. Fifty percent pure protein, as derived herein, was compared with 10 times recrystallized glucagon-free insulin and found to have approximately two orders of magnitude greater glucose uptake activity on a weight to weight basis.

Example 2

This example illustrates the influence of the present protein on metabolic activity of isolated perfused rabbit livers. A liver perfusion apparatus was used which was a modification of that described by Rink et al. in Anesthesiology, 17:377, 1956. The device is enclosed in a thermo-regulated cabinet at 37° C. and consists essentially of three components: (1) a pump which maintains the blood flow; (2) an oxygenator which ventilates the blood; and (3) a freshly obtained liver which utilizes the blood. The system utilizes a closed gas system which permits a determination of the amount of oxygen utilized by the liver and the amount of carbon dioxide produced.

New Zealand white male rabbits, fasted 24 hours, were used as liver and blood donors. The perfusate consisted of 200 ml. of heparinized blood collected from two donor animals under light Nembutal anesthesia. The blood was diluted with an equal volume of normal saline solution and 60,000 units of penicillin were added.

The liver was surgically removed from one donor animal, under light Nembutal anesthesia. After cannulation of the portal vein, the liver was quickly perfused with 20 ml. of a heparinsaline solution to prevent clot formation. The time interval between interruption of the portal circulation and establishment of the perfusion circulation ranged from six to ten minutes. The weight range of the livers used in the study was between 80 and 110 grams. The livers were perfused for thirty minutes prior to making any measurements in order to allow for equilibration of the system and to insure adequate oxygen saturation of the perfusate.

All samples were obtained from the "venous blood" immediately after its passage through the liver. Urea nitrogen was determined by the method of Gentzkow and Masen, J. Biol. Chem. 143:531, 1942. Glucose was determined on tungstic acid blood filtrates by the method of Folin and Wu, J. Biol. Chem. 41:367 1920. Oxygen consumption by the liver was obtained by a direct reading from the graduated oxygen buret after restoring the initial manometric pressure of 1cm. water with a leveling bulb. Expired carbon dioxide was absorbed in standard NaOH contained in an alkali trap. The trap was changed every half hour. An excess of $BaCl_2$ was added to an aliquot and the $CO_2$ precipitated out as $BaCO_3$. The residual NaOH was then titrated against a standard 0.1N HCl solution. The oxygen used and $CO_2$ produced were then corrected to standard conditions and expressed as ml. per 100 grams of liver tissue. The criteria used for a successful experiment were the following:

a. A constant perfused flow rate.
b. A steady rate of oxygen utilization.
c. A steady rate of bile formation.

Figure 2:
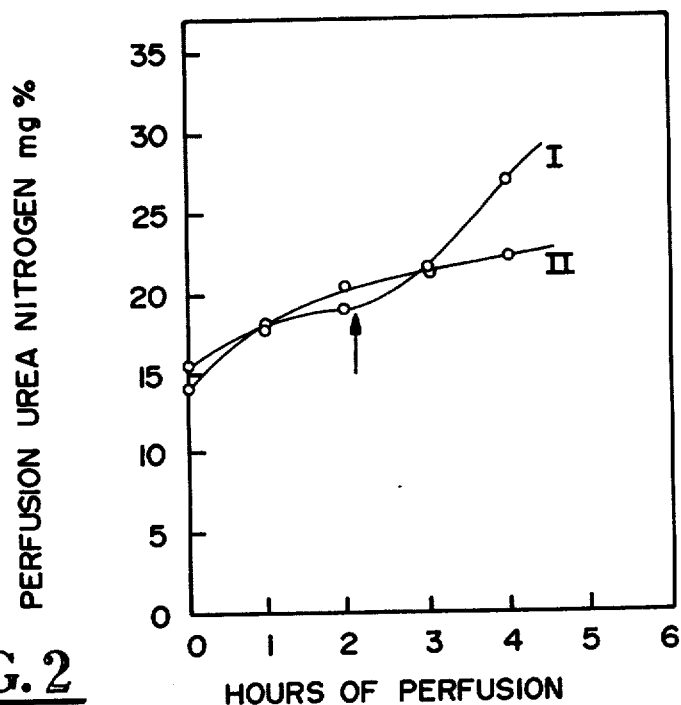
FIG. 2 is a graph illustrating the rate of urea nitrogen synthesis in perfused liver.

When the protein of this invention is injected into isolated perfused rabbit liver, the rate of synthesis of urea nitrogen is increased. FIG. 2 is a graph illustrating the rate of urea nitrogen synthesis of a control study in a dotted line and the rate with an injection of the protein of this invention in solid line. The rate of urea synthesis is plotted against time. It will be noted that the rate of urea nitrogen increase, after injection of the protein after two hours, is much greater with the present protein than without, as shown by the steeper slope in the solid line. In addition to urea synthesis, there was a marked increase in the rate of production of $CO_2$, averaging 35 ml./hour/100 gms. of liver greater than the control. Also, the viability of the liver was greatly prolonged (from about four hours to seven hours or more) as indicated by oxygen utilization, $CO_2$ production, urea synthesis and bile flow.

Figure 3:
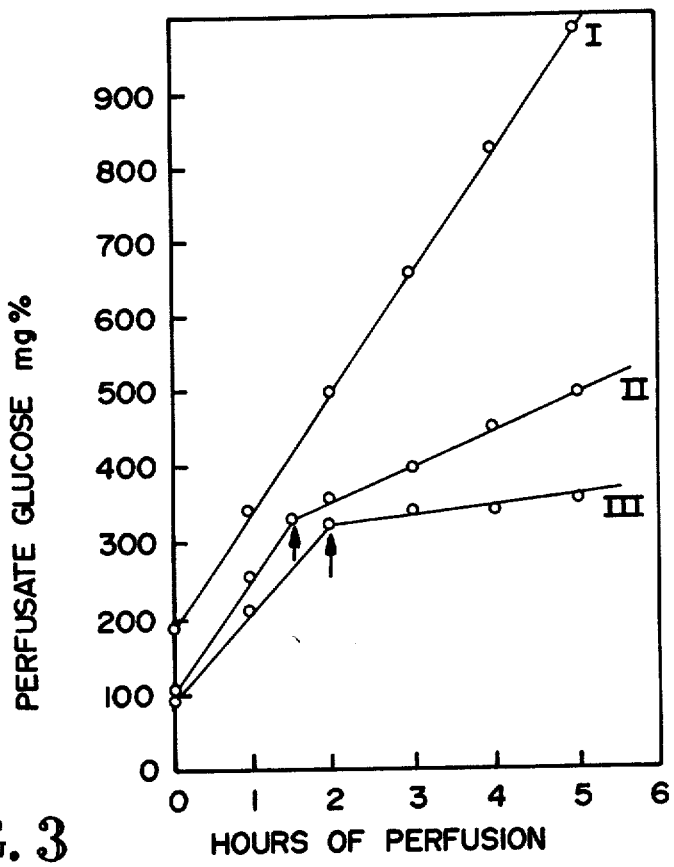
FIG. 3 is a graph illustrating the rate of carbohydrate metabolism in perfused liver.

FIG. 3 shows the effect of the present protein on metabolism of carbohydrate in the perfused liver. The isolated perfused rabbit liver is extremely sensitive to the presence of glucagon. The hyperglycemic effect of glucagon can be demonstrated with less than 0.05 microgram of crystalline glucagon in a perfusate volume of 400 ml and the effect is apparent within a few minutes. Glucagon was infused at a constant rate (approximately 5.0 micrograms over the 4 hour time) from zero time in each of the experiments. Curve I shows the hyperglycemic effect over a 5 hour period. In the experiments plotted in curves II and III, a single addition of the present protein was made at 1½ and at 2 hours time and this was followed almost immediately by a downward change in the slope of the curve.

Example 3

This example illustrates the effect of the protein of this invention on peripheral blood ammonia in horses. The crude protein in water for the injection was injected intravenously into six test horses 12 hours prior to the start of controlled exercise. Five control horses were not so injected, but were subjected to the same activity. All horses were tested for blood ammonia at rest before exercise, and then subjected to the same strenuous exercise. After exercise, each horse was measured for blood ammonia immediately after exercise; after 75 minutes and four hours after exercise. The blood ammonia, expressed as mcg. per 100 ml., is shown in Table I.

Similar results in the reduction of blood ammonia were determined with rabbits, where increase in blood ammonia was induced by injection of Metrazol. Disappearance of the blood ammonia proceeded much more rapidly in rabbits previously injected intravenously with partially purified protein.

TABLE I

CONTROL GROUP

| Horse No. | Resting | Time after Exercise | | |
|---|---|---|---|---|
| | | 0 Min. | 75 Min. | 4 Hours |
| 1 | 45.2 | 94.9 | 83.3 | 89.0 |
| 2 | 31.5 | 100.3 | 93.0 | 56.6 |
| 3 | 7.3 | 104.4 | 93.7 | 68.8 |
| 4 | 23.0 | 96.3 | 84.5 | 62.5 |
| 5 | 11.2 | 100.5 | 73.3 | 70.2 |
| 6 | — | — | — | — |
| Mean | 23.6 | 99.3 | 85.6 | 69.4 |

TREATED HORSES

| Horse No. | Resting | Time After Exercise | | |
|---|---|---|---|---|
| | | 0 Min. | 75 Min. | 4 Hours |
| 1 | 31.6 | 27.8 | 0 | 7.8 |
| 2 | 49.5 | 57.6 | 2.3 | 2.8 |
| 3 | 16.2 | 71.0 | 14.8 | 15.1 |
| 4 | 31.1 | 71.5 | 3.0 | 20.6 |
| 5 | 23.0 | 30.9 | 0 | 3.0 |
| 6 | 21.6 | 23.3 | 0 | 15.6 |
| Mean | 28.8 | 47.0 | 3.4 | 10.8 |

The protein of the present invention resembles insulin in a number of significant ways. Particularly, insulin increases the uptake of glucose in muscle, such as rat diaphragm. The present protein has substantially greater activity than insulin in this respect as noted in Example 2. However, the present protein differs from insulin in that it has no influence on blood glucose levels in the intact animal. Further, the present protein prolongs the survival of isolated perfused rabbit liver as measured by its metabolic activity in oxygen consumption and carbon dioxide production. Insulin fails to produce either of these effects.

The influence on tissue glucose uptake and increased synthesis of liver glycogen without resulting hypoglycemia constitutes a mobilization of energy for overcoming certain disease states. The protein of the present invention is useful in counteracting stressor caused shock and damage, including experimentally induced uremia, reticuloendothelial damage and decreased survival from administered 6-mercaptopurine and AET.

The protein of the present invention finds utility in the treatment of uremia. One indicator of the existence of uremia is azotemia, or an excess of nitrogenous substances in the blood as a result of kidney insufficiency. Another indicator of uremia is proteinuria, which is the presence of protein in the urine. We have found that the protein of the present invention is especially valuable in treating dogs with azotemia and proteinuria. Since the protein exhibits basic activity in metabolism of carbohydrate and urea cycle, a large variety of clinical effects are found, both in humans and in animals.

Example 4

The effect of the protein of the present invention on dogs with azotemia and proteinuria was determined in this example. Each animal received an intravenous injection containing the protein of this invention. Table II shows the effects of the protein on proteinurea and blood urea nitrogen (B.U.N.) concentration, a convenient index of the kidneys' ability to excrete metabolic wastes. Proteinurea is measured as amount of precipitate in accordance with Page and Culver, Eds, "Syllabus of Laboratory Examinations in Clinical Diagnosis" Harvard Univ. Press (1960) at page 298.

Table II

| Dog No. | No. of Inj. | BUN mg/100 ml. Before | After | % Drop | Proteinuria Before | After | Diagnosis |
|---|---|---|---|---|---|---|---|
| 1 | 11 | 140 | 20 | 76 | 4+ | Neg. | Recovered |
| 2 | 19 | 178 | 29 | 84 | 4+ | + | Recovered |
| 3 | 17 | 106 | 26 | 75 | 4+ | 1∓ | Recovered |
| 4 | 9 | 43 | 18 | 58 | 3+ | + | Recovered |
| 5 | 11 | 152 | 22 | 85 | 4+ | Neg. | Recovered |
| 6 | 7 | 48 | 18 | 63 | 3+ | + | Recovered |
| 7 | 13 | 96 | 20 | 79 | 4+ | Neg. | Recovered |
| Mean | | | | 74 | | | |

In a series of 43 dogs with azotemia and proteinuria as determined by laboratory tests, 20 were treated with conventional therapy only and used as controls. Eight of the control animals died. Although the animals in the protein-treated group were more severely ill as determined by laboratory tests, only one animal in this group died. The dogs which recovered in the protein-treated group responded in a significantly shorter period of time than those that recovered in the conventional therapy group.

Experimental studies of the protein indicating its fundamental effect in carbohydrate metabolism and the urea cycle and its clinical effectiveness in small animal renal conditions led to its use in small animal shock and poor surgical risk cases. In cases of shock in small animals, conventional therapy consists of a combination of whole blood or fluid replacement, circulatory stimulants, coagulants, endocrine therapy, antibiotics, pain or tranquilizer therapy, and oxygen, warmth and rest. The ability of the protein of the present invention to effect rapid and complete recovery by small animals from severe traumatic and/or hemorrhagic shock without aid of concommitant conventional therapy was determined.

Twenty-one small animals with severe traumatic and/or hemorrhagic shock received one injection each of this protein. No other therapy was given to control the shock. Several cases were diagnosed as terminal, with death expected within moments. Each case recovered rapidly and completely from shock, enabling the veterinarian to proceed immediately with surgical repair when necessary. The unusual rapidity with which the shock was controlled was responsible in many cases for saving the life of the patient.

Example 5

A 1½ year old dog of a small mixed breed had been struck by a car 30 minutes before he was brought to the hospital. He was in deep shock, with pale mucous membranes, abnormal heart rate and force, and very shallow, rapid respiration. The patient had a coxofemoral luxation. There was no external or internal bleeding. One injection of 10 ml. of a 97% purified preparation was administered slowly. Before the injection was completed, the animal began to respond; it raised its head and rapidly became aware of its surroundings. Respiration, heart rate, and color of mucous membranes returned to normal. Return of pink color to mucous membranes paralleld that seen when a patient responds to whole blood transfusion although no transfusion was given. No other therapy was necessary for rapid, complete, and uneventful recovery from shock.

In a group of 85 cases of shock in dogs, treated with the protein of this invention, 80% survived the shock and tolerated subsequent surgical repair. Some of these cases were complicated by massive hemorrhage, fractures including skull fracture, internal injuries, and by overwhelming infection (pyometra). Criteria for selection of these patients for study included blanched mucous membranes; cold extremities; weak or feeble, rapid pulse (when possible to find); abnormal heart rate changes with decreased output; increased shallow respiration; and abnormal temperature. Based on an evaluation of each case, and a comparison to similar past cases treated in the hospital, the prognosis of each of the 85 cases suggested that a survival rate for the group without use of the drug would have been 30 animals, or about 35%.

Example 6

The anti-inflammatory effect of the protein of the present invention on soft tissue lesion experimentally induced in horses was determined in this example. Each animal received 30 cc. of 25% chloral hydrate solution injected into tissues of neck in area surrounding jugular vein to produce the desired acute lesion. Three horses received 100 units of a 97% purified preparation of protein of the present invention on the first day. Two horses were used as controls. One received no therapy. A second received chymotrypsin, a conventional therapy. The preparation was used intravenously in all cases. Response to therapy was compared to documented control experience of 100% incidence of typical lesion with football size swelling and extensive severe necrosis and sloughing caused by chloral hydrate injected into tissues of neck in area surrounding jugular vein. In each case, the swelling had receded or else the horse was normal by the seventh day. In the control horse, the swelling reached the size of a football by the sixth day, with sloughing and a sterile abscess. On the seventh day, the non-treated control horse received 100 units of the protein in an attempt to reverse or stop the severe necrosis and sloughing of tissue. In all cases, including the control horse, the lesion was healed and the horse was normal by the twelfth day. In the control horse treated with conventional therapy, the lesion continued to progress in intensity and the animal had to be sacrificed.

Clinical studies also show the ability of the protein of the present invention to systemically enhance softening of chronic urethral strictures in humans and to cause these strictures to dilate easily without local anesthetic and to remain dilated for periods of one to five or more years without need for further therapy of any kind.

The protein of this invention also has utility in the treatment of hepatitis and uremia in humans, largely because of its fundamental effect on the metabolism of urea.

It will be understood that commercial preparations employing the active factor of the present invention may contain, besides concomitant proteins, other materials. As used for intravenous and intramuscular injection (which are at present the preferred modes of administration) the material will be dissolved in water which may be made isotonic with sodium chloride, glycine, dextrose, glucose or the like. Other pharmaceutically compatible excipients are suitable for use with the protein. Other modes of administration include intraperitoneal, subcutaneous, intradermal, buccal and suppository. Other proteins may be added; also antibiotics such as penicillin; vitamins such as ascorbic acid and vitamin $B_{12}$; etc. The material may be lyophilized for storage and reconstitution.

It will be apparent that the present invention provides a new simple protein of molecular weight of about 25,000 which exhibits biological activity, particularly in the treatment of uremia where the properties of facilitating glucose absorption and glycogen synthesis are of value. The invention also includes the method of preparation of the protein from a suitable source, such as liver. The method of using the invention includes injection of the protein for the treatment of uremia, inflammation and shock in mammals. The protein influences the metabolium of carbohydrate and the urea cycle.

What is claimed is:

1. A composition for the treatment of disease in mammals comprising (a) a pharmaceutically compatible excipient and (b) protein in an amount effective for enhancing metabolic functions, said protein being a biologically active protein derived by:
   1. treating liver with an aqueous solution of divalent metal activating cation at a pH essentially neutral or slightly alkaline and separating the resultant solids from the liquid;
   2. treating the liquid with heavy metal precipitating agent and separating the resultant precipitate from the liquid;
   3. adjusting the pH of the liquid from step (2) to a range of between 8.3 and 8.5 and separating the resultant precipitate from the liquid;
   4. treating the liquid from step (3) with a concentrated solution of salting out agent to precipitate undesired protein and separating the protein precipitate from the liquid;
   5. adding solvent to the liquid from step (4) in an amount sufficient to give the resultant mixture a solvent concentration of 20 to 26% by volume and separating the resultant precipitate from the liquid; adding solvent to the liquid in an amount sufficient to give the resultant mixture a solvent concentration to 35 to 40% by volume to produce a mixture having three layers; separating the upper layer and adding to it in amount sufficient to give the resultant mixture a solvent content 70 and 77% by volume whereby protein is precipitated;
   6. separating the protein precipitate and dispersing it in a solvent at a pH of 7.8 to 8.2;
   7. dialyzing the dispersion from step (6);
   8. heating the dialyzate from step (7) to a temperature between 46° and 50° C. and separating the resultant precipitate from the liquid;
   9. subjecting the liquid from step (8) to electrophoresis and recovering a biologically active protein.

2. A method of treating an inflammatory condition comprising injecting a therapeutically effective amount of the composition of claim 1.

3. A method of treating shock comprising injecting a therapeutically effective amount of the composition of claim 1.

4. A method of treating uremia comprising injecting a therapeutically effective amount of the composition of claim 1.

5. A method of treating hepatitis comprising injecting a therapeutically effective amount of the composition of claim 1.

6. A method of increasing the rate of urea nitrogen synthesis in mammalian liver comprising injecting a therapeutically effective amount of the composition of claim 1 into the mammal.

7. A method of reducing peripheral blood ammonia in mammals comprising injecting a therapeutically effective amount of the composition of claim 1.

8. A method of simultaneously facilitating glucose uptake and glycogen deposition in mammalian cells comprising injecting a therapeutically effctive amount of the composition of claim 1 into the mammal.

* * * * *